(12) United States Patent
Hjelland et al.

(10) Patent No.: US 10,590,207 B2
(45) Date of Patent: Mar. 17, 2020

(54) PROCESS FOR ISOLATING FUCOIDAN AND LAMINARIN FROM LIVE, HARVESTED SEAWEED

(75) Inventors: Finn Hjelland, Vormedal (NO); Arne Henning Andersen, Vormedal (NO); Hui S. Yang, Plainsboro, NJ (US)

(73) Assignee: DuPont Nutrition USA, Inc.

( * ) Notice: Subject to any disclaimer, the term of this patent is extended or adjusted under 35 U.S.C. 154(b) by 204 days.

(21) Appl. No.: 13/299,615

(22) Filed: Nov. 18, 2011

(65) Prior Publication Data

US 2012/0302742 A1 Nov. 29, 2012

Related U.S. Application Data

(60) Provisional application No. 61/416,641, filed on Nov. 23, 2010.

(51) Int. Cl.
*C08B 37/00* (2006.01)

(52) U.S. Cl.
CPC ...... *C08B 37/0003* (2013.01); *C08B 37/0024* (2013.01); *C08B 37/0063* (2013.01)

(58) Field of Classification Search
None
See application file for complete search history.

(56) References Cited

U.S. PATENT DOCUMENTS

| | | | |
|---|---|---|---|
| 4,851,224 A * | 7/1989 | McAnalley | 424/744 |
| 4,902,417 A * | 2/1990 | Lien | B01D 63/10 |
| | | | 210/321.74 |
| 7,422,750 B2 | 9/2008 | Umeda | |
| 7,611,716 B2 * | 11/2009 | Michailovna et al. | 424/195.17 |
| 7,749,545 B2 | 7/2010 | Mower | |
| 2005/0049221 A1 | 3/2005 | Umeda | |
| 2009/0105190 A1 | 4/2009 | Hatano | |
| 2009/0170810 A1 | 7/2009 | Hao | |
| 2009/0270607 A1 | 10/2009 | Oh | |
| 2010/0056473 A1 | 3/2010 | Hagiwara | |
| 2010/0144667 A1 | 6/2010 | Shaklee et al. | |
| 2011/0152144 A1 | 6/2011 | Copp et al. | |
| 2012/0189706 A1 | 7/2012 | Copp et al. | |
| 2012/0190600 A1 | 7/2012 | Copp et al. | |

FOREIGN PATENT DOCUMENTS

| | | | |
|---|---|---|---|
| JP | 10-195106 A | 7/1998 | |
| JP | 2003-155244 | 5/2003 | |
| JP | 2005-330454 A | 12/2005 | |
| RU | 2302429 C1 * | 7/2007 | ............ C08B 37/18 |
| WO | WO 2008/041799 A1 | 4/2008 | |

OTHER PUBLICATIONS

Ross, Anastasakis, Kubacki and Jones. Investigation of the pyrolysis behaviour of brown algae before and after pre-treatment using PY-GC/MS and TGA. J, Anal. Appl. Pyrolysis, 85, 2009. pp. 3-10.*
Yoshino et al., JP 2005330454 A, Dec. 2005, machine translation. Retreived on Apr. 3, 2013 from http://dossier1.ipdl.inpit.go.jp/AIPN/odse_top_dn.ipdl?N0000=7400.*
Artyukov A A et al., RU 2302429 C1, Jul. 2007, machine translation. Retreived on Apr. 3, 2103 from http://translate.google.com.*
Sieburth, J. M., & Jensen, A. (1969). Studies on algal substances in the sea. II. The formation of Gelbstoff (humic material) by exudates of phaeophyta. Journal of Experimental Marine Biology and Ecology, 3(3), 275-289.*
Yoshino et al., JP 2005330454 A, Dec. 2005, partial human translation. Received from USPTO STIC translator Steven Spar on Jan. 17, 2020 (Year: 2005).*
PCT "Third Party Observation" Submitted Dec. 3, 2012; PCT/US2011/061308; 5 Pgs.
Anonymous "Observations Filed in Respect of PCT/US2011/061308" dated Oct. 26, 2012; 7 Pgs.
Schweiger; "Methanolysis of Fucoidan—I. Preparation of Methyl α-L-Fucoside and L-Fucose", J. Org. Chem.; Dec. 1962; vol. 27; pp. 4267 to 4269.
Larsen; "Handbook of Phycological Methods"; Physiological and Biochemical Methods; Cambridge University Press, 1973; pp. 152-156.
Ermakova, et al.;"Fucoidans from Brown Seaweeds *Sargassum hornery, Eclonia cava, Costaria costata*: Structural Characteristics and Anticancer Activity"; Appl. Biochem Biotechnology; Feb. 8, 2011; pp. 10.
Kim; "Anti-apoptotic activity of laminarin polysaccharides and their enzymatically hydrolyzed oligosaccharides from Laminaria japonica"; Biotechnology Letters (2006) vol. 28; pp. 439-446.
Klarzynski, et al.; "Linear β-1,3 Glucans Are Elicitors of Defense Responses in Tobacco"; Plant Physiology, Nov. 2000, vol. 124, pp. 1027-1037.
Preeprame, et al.; "A Novel Antivirally Active Fucan Sulfate Derived from an Edible Brown Alga, *Sargassum horneri*"; Chemical Pharmaceutical Bulletin; 2001; vol. 49(4); pp. 484-485.
Black, et al.; "Manufacture of Algal Chemicals. IV.—Laboratory-Scale Isolation of Fucoidin from Brown Marine Algae"; J. Sci. Food Agrie; Mar. 3, 1952; pp. 122-129.
Percival, et al.; The Isolation and Purification of Fucoidin from Brown Seaweeds; J. Chem. Soc., 1950; pp. 717-720.
Hoagland, et al.; "The Complex Carbohydrates and Forms of Sulphur in Marine Algae of the Pacific Coast"; J. Biol. Chem.; Aug. 18, 1915; vol. 23; pp. 287-297.

(Continued)

*Primary Examiner* — Dale R Miller

(57) ABSTRACT

The present invention is directed to a process for obtaining at least one of fucoidan and laminarin from live, harvested seaweed, wherein the process comprises the steps of: (i) harvesting seaweed comprising fucoidan and laminarin to obtain live, harvested seaweed, wherein the live, harvested seaweed exudes to form an exudate solution; (ii) collecting the exudate solution from the live, harvested seaweed, wherein the fucoidan and laminarin are dissolved in the exudate solution; and (iii) separating the at least one of fucoidan or laminarin from the exudate solution.

34 Claims, No Drawings

(56) References Cited

OTHER PUBLICATIONS

Haneji, et al.; "Fucoidan Extracted from Cladosiphon Okamuranus Tokida Induces Apoptosis of Human T-Cell Leukemia Virus Type 1-Infected T-Cell Lines and Primary Adult T-Cell Leukemia Cells"; Nutrition and Cancer; 2005; 52(2); pp. 189-201.

Nagaoka, et al.; "Structural Study of Fucoidan from Cladosiphon Okamuranus Tokida"; Glycoconjugate Journal; 1999; vol. 16; pp. 19-26.

Notification of Transmittal of the International Search Report and the Written Opinion of the International Searching Authority, or the Declaration, International Application No. PCT/US2011/061308, dated May 1, 2012.

Lynch, Mary B., et al., "The Effect of Dietary Laminaria-Derived Laminarin and Fucoidan on Nutrient Digestibility, Nitrogen Utilisation, Intestinal Microflora and Volatile Fatty Acid Concentration in Pigs", J. Sci. Food Agric., (2010), vol. 90, pp. 430-437, Published online in Wiley Interscience Dec. 16, 2009.

Fucoidans and Fucoidanases—Focus on Techniques for Molecular Structure Elucidation and Modification of Marine Polysaccharides, Appl. Microbiol Biotechnol Feb. 2009, 82 (1): 1-11.

Beress, et al.; "A New Procedure for the Isolation of Anti-HIV Compounds (Polysaccharides and Polyphenols) From the Marine Alga *Fucus vesiculosus*", Journal of Natural Products, 1993, 56(4), pp. 478-488).

Lunde, Gulbrand, English Translation of—Seaweed as Source of Raw Materials (Der Meerestang Als Rohstoffquelle), Angewandte Chemie; Angewandte Chemie Sep. 4, 1937 Verein Deutscher Chemiker, Berlin, Germany, vol. 50, No. 36, pp. 731-734, XP002720985.

Lunde, Gulbrand, et al., English Translation of—"Ueber Fucoidin", Hoppe-Seyler's Zeitschrift Fuer Physiologische Chemie, vol. 247, No. 4-5, 1937, pp. 189 to 196 XP009176517, ISSN: 0019-4888.

Bruhn et al., "Crude fucoidan content in two North Atlantic kelp species, *Saccharina latissima* and *Laminaria digitata*—seasonal variation and impact of environmental factors", J Appl Phycol, 2007, vol. 29, pp. 3121-3137.

Pomin et al., "Mild acid hydrolysis of sulfated fucans: a selective 2-desulfation reaction and an alternative approach or preparing tailored sulfated oligosaccharides", Glycobiology, 2005, vol. 15, No. 12, pp. 1376-1385.

\* cited by examiner

PROCESS FOR ISOLATING FUCOIDAN AND LAMINARIN FROM LIVE, HARVESTED SEAWEED

FIELD OF THE INVENTION

The present invention is directed to a process for obtaining at least one of fucoidan or laminarin from the exudate solution of live, harvested seaweed.

BACKGROUND OF THE INVENTION

Fucoidans and laminarins are natural polysaccharides present in the extracellular matrix of brown seaweeds (Phaeophyceae). Fucoidans primarily contain L-fucose and ester sulfate groups, with lesser amounts of other monosaccharides such as galactose, glucose, mannose, xylose, and arabinose; uronic acids such as glucuronic acid; cations such as sodium, potassium, calcium, and magnesium; and protein. Laminarins are linear glucans (i.e., polysaccharides based on glucose). Alternate names for fucoidan include fucoidin, fucan, fucosan, and sulphated fucan; alternate names for laminarin include laminaran, storage glucan, and beta glucan.

The molecular structures of fucoidan can vary somewhat depending on the algae. Although each seaweed species comprises a unique individual fucoidan, there is at least one important compositional feature that all fucoidans have in common; i.e., the primary components are always L-fucose and ester sulphate with the ester sulphate residues always being on the polyfucan molecular backbone. Depending on manufacturing methods, components other than sulphated polyfucan are often included with the fucoidan. Such additional components include neutral monosaccharides, such as galactose, glucose, mannose, xylose, arabinose and rhamnose; uronic acids, such as glucuronic acid; cations, such as sodium, potassium, calcium and magnesium; and protein. The molecular backbone of fucoidan molecules is linear α-L-fucose, but the overall structure has extensive branching, which may include additional L-fucose in addition to the other components mentioned above. The ester sulphate groups are on L-fucose units, but not all L-fucose units are sulphated, and the distribution of these ester sulphates varies by species, by location, and by season. Similarly, some fucoidans are partially acetylated on the fucose backbone, and the distribution of these O-acetyl groups can vary by species, by location, and by season.

The molecular structures of laminarins are less complex than fucoidans, and they are β-glucans comprising mostly 1-3 linkages, but also with occasional 1-6 linkages to interrupt complete linearity. The structure of laminarin varies by species, by location, and by season.

Fucoidans and laminarins have been extensively studied for their biological activities, including anticoagulant, antithrombotic, antivirus, antitumor, anticomplementary, immunomodulatory, anti-inflammatory, blood lipid reducing, antioxidant, activity against hepatopathy, uropathy and renalpathy, gastric protective effects, and therapeutic potential in surgery.

Conventional processes for extracting fucoidan from seaweed do not utilize exudation, but instead involve complicated chemical and mechanical extraction steps that have been taught to be critical. For example, Holtcamp, et al., APPL Microbiol Biotechnol (2009), 82, 1-11, teaches the use of chemical and mechanical extraction processes from dried seaweed as being critical to get suitable amounts for structural categorization of fucoidan.

US 2009/0170810 teaches chemical extraction, purification and fractionating steps for obtaining fucoidan from seaweed. For example, water, diluted acid or calcium chloride solution is added to the seaweed, then lead hydroxide, aluminum hydroxide, ethanol or quaternary ammonium salts or cationic surfactants are added to precipitate the fucoidan. The crude fucoidan often contains alginate, proteins, laminarin, and pigments. As such, the crude fucoidan is further extracted with hot water and ethanol in the presence of magnesium chloride.

US 2009/0105190 discloses the addition of ethanol to the raw alga body of Cladosiphon, removal of the ethanol, followed by hot water extraction comprising the addition of sufficient amounts of water and hydroxides to the extract. The temperature of the hot water extraction is preferably from 70 to 100° C. for 0.5 to 2 hours. The use of ethanol in this process dehydrates the fresh seaweed and removes color. Exudation will not occur in such a process as the ethanol would tighten the seaweed structure and "pores" preventing exudation. Hot water is then necessary to release the fucoidan into solution by breaking down the tightened seaweed structure.

There is a desire to use simpler processes for isolating fucoidan and laminarin from seaweed that produce commercial quantities of fucoidan and laminarin in pure form (i.e., fucoidan and laminarin that are not degraded and depolymerized by acid treatment, alkali treatment or thermal treatment).

As the present invention obtains the fucoidan and laminarin from the exudate of live, harvested seaweeds in purity and yield levels suitable for commercial manufacture, the significantly more complicated and costly chemical extraction methods heretofore known and used are not necessary or desired.

SUMMARY OF THE INVENTION

The present invention is found to provide a simple and economical process for obtaining fucoidan and laminarin in commercial quantities and purity levels from the exudate of live, harvested seaweed.

More specifically, the present invention is directed to a process for obtaining at least one of fucoidan and laminarin from live, harvested seaweed, wherein the process comprises the steps of: (i) harvesting seaweed comprising fucoidan and laminarin to obtain live, harvested seaweed, wherein the live, harvested seaweed exudes to form an exudate solution; (ii) collecting the exudate solution from the live, harvested seaweed, wherein the fucoidan and laminarin are dissolved in the exudate solution; and (iii) separating the at least one of fucoidan or laminarin from the exudate solution.

DETAILED DESCRIPTION OF THE INVENTION

Step (i) in the process of the present invention comprises harvesting seaweed comprising fucoidan and laminarin to obtain live, harvested seaweed, wherein the live, harvested seaweed exudes to form an exudate solution. When seaweed is harvested and is alive as in step (i), the seaweed undergoes a natural exudation process. This exudation process is an active physiological process by which the plant cells transport the fucoidan and laminarin internally from the plant to the surface of the seaweed as an exudate solution. The exudate solution typically contains the fucoidan and laminarin, as well as seawater, protein, sea salt, and several other minor low molecular weight components such as mannitol. This exudation process is a healing and defensive action in response to being harvested. The slow escape of liquids ("sap") occurs from vessels through pores and breaks in cell membranes. The act of exuding is like sweating and in plants can include the discharge of moisture, gum, juice, etc., through pores and incisions.

As used herein, "live, harvested" seaweed means a marine, benthic macroalgae ("Kelp") that is still alive after harvest as indicated by its ability to exude. In clear distinction to live, harvested seaweed, dried seaweed is dead and no longer capable of exudation. Seaweed that is capable of exuding is a live respiring plant as opposed to a dead plant which no longer has any biological activity such as respiration.

The following is a taxonomic list of typical seaweed species containing both fucoidan and laminarin that may be used in the present invention. The algal class is: Phaeophyceae. The algal orders are: Laminariales, Fucales, Durvillaeaceae, Ectocarpales, Dictyotales, Scytosiphonales, and Desmarestiales. The algal families are: Laminariaceae, Lessoniaceae, Alariaceae, Chordaceae, Fucaceae, Sargassaceae, Himanthaliaceae, Chordariaceae, Adenocystaceae, Dictyotaceae, Scytosiphonaceae, and Desmarestiaceae. The algal genuses are: *Laminaria, Durvillaea, Arthrothamnus, Macrocystis, Nereocystis, Saccharina, Ecklonia, Lessonia, Elsenia, Alaria, Undaria, Chorda, Ascophyllum, Fucus, Silvetia, Pelvetia, Sargassum, Hizikia, Bifurcaria, Himanthalia, Cladosiphon, Nemacystus, Dictyosiphon, Chordaria, Saundersella, Adenocystis, Spatoglossum, Dictyota, Padina, Scytosiphon, Petalonia*, and *Desmarestia*. The algal species are: *Laminaria digitata, Laminaria hyperborea, Laminaria japonica, Laminaria angustata, Laminaria brasilliensis, Laminaria cichorioides, Arthrothamnus bifidus, Macrocystis pyrifera, Nereocystis luetkeana, Saccharina longicruris* (*Laminaria longgicruris*), *Saccharina sculpera* (*Kjellmaniella crassifolia*), *Ecklonia maxima, Ecklonia cava, Ecklonia kurome, Lessonia nigrescens, Lessonia vadosa, Elsensia bicyclis, Alaria marginata, Undaria pinnatifida, Chorda filum, Ascophyllum nodosum, Fucus vesiculosus, Fucus distichus, Fucus evanescens, Fucus serratus, Fucus spiralis, Silvetia babingtonii, Pelvetia canaliculata, Sargassum fusiforme, Sargassum horneri, Sargassum muticum, Sargassum stenophyllum, Hizikia fusiformis* (*Hizikia fusiforme*), *Bifurcaria bifurcata, Himanthalia elongata* (*Himanthalia lorea*), *Cladosiphon okamuranus, Nemacystus decipiens, Dictyosiphon foeniculaceus, Chordaria flagelliformis, Chordaria gracilis, Saundersella simplex, Adenocystis utricularis, Spatoglossum schroederi, Dictyota dichotoma, Dictyota menstrualis, Padina pavonica, Scytosiphon lomentaria, Petalonia fascia, Durvillaea antartica, Durvillaea potatorum*, and *Desmarestia intermedia*.

Prior to collecting the exudate solution in step (ii) in the process, it is desirable that the seaweed not be subjected to treatments that degrade the seaweed thereby hindering or altogether terminating the exudation process. Such undesirable processes include thermal treatment above 30° C., acid treatment or alkali treatment. Preferably, prior to step (ii), the seaweed is kept at a temperature above 0° C., 2° C., and 3° C. and below 30° C., 25° C., 24° C., 23° C., 22° C., 21° C., and 20° C.

Furthermore, in order to improve the yield of the fucoidan and laminarin in the exudate solution, it is preferable to maintain the seaweed prior to step (ii) in conditions that are ideal for the exudation process to proceed as long as desired, such as conditions that do not expedite the desiccation of the seaweed. Ideal conditions include shaded areas in which the seaweed is piled together.

Step (ii) in the process of the present invention collects the exudate solution from the live, harvested seaweed. The fucoidan and laminarin are dissolved in the exudate solution. As a result, the fucoidan and laminarin are obtained in the process of the present invention from the exudate solution. Any process for collecting the exudate solution can be utilized in the present invention. The exudate solution can be collected at any time after exudation has begun.

The typical duration for exudation (prior to collection in step (ii)) will vary by species, season of harvest and exudation temperature and moistness conditions. Generally, the period of exudation will be from 12 hours until plant death, and can be greater than 12 hours, greater than 1 day, and greater than 2 days. Typical duration times for exudation could be from 12 hours to three weeks, from 1 day to 2 weeks, from 1 day to 1 week, from 1 day to 5 days, from 1 day to 4 days, from 2 days to 3 weeks, from 2 days to 2 weeks, from 2 days to 1 week, from 2 days to 5 days, and from 2 days to 4 days.

Prior to collecting the exudate solution in step (ii), the live, harvested seaweed of the present invention can be whole, cut or otherwise mechanically manipulated provided the seaweed remains alive and capable of exuding. For example, seaweed cut to below 5 mm in size will have a deleterious impact on the exudation process. As a result, it is desired not to mill or grind the seaweed, but to cut the seaweed into pieces that are greater than or equal to 1 cm in size. Once the exudate solution is collected, the seaweed that is left behind is still recognizable as seaweed botanically and taxonomically as the extraction process of the present invention is a natural process.

Once the exudate solution is collected, the at least one of fucoidan or laminarin is separated from the exudate solution in step (iii). The separation of the fucoidan and laminarin from the exudate solution can be performed using any known separation techniques. For example, as the exudate solution may contain solid debris, a first filtration step may be (but is not required to be) performed in order to separate and discard the solid debris from the exudate solution.

Separation of the fucoidan and laminarin from the exudate solution may be performed by alcohol precipitation (e.g., about 2 parts alcohol to about 1 part of fucoidan and laminarin solution). The fucoidan will separate first and can be filtered from the solution. The laminarin will remain in the exudate/alcohol solution for a longer period of time and can be removed after settling. Isopropyl alcohol is one example of an alcohol that can be used to precipitate both fucoidan and laminarin.

Another technique that can be used for separation of both the fucoidan and the laminarin from the exudate solution is ultrafiltration. Ultrafiltration separates the various components in the exudate solution based on their size and molecular weight. The molecular weight of the fucoidan and laminarin can vary depending on the seaweed species and season of harvest. As a result, the molecular weight cut off ("MWCO") of the membranes chosen for ultrafiltration and separation will be dependent on the molecular weight of the fucoidan and laminarin in the given seaweed and the desired separation levels between the two.

For example, laminarin typically has a lower molecular weight than fucoidan. Depending on the molecular weight of the fucoidan and laminarin in the seaweed, one could use a MWCO of at least 10 kDa, 20 kDa, 30 kDa, 50 kDa, 80 kDa, 100 kDa or 0.1μ to separate the fucoidan from the laminarin as appropriate. Such a separation will result in the fucoidan being found in the retentate and the laminarin being found in the filtrate. At any point, the exudate solution may also be nanofiltrated using the appropriate MWCO, for example, a MWCO of 1 kDa or less, to separate the fucoidan and/or the laminarin from lower molecular weight components. After ultrafiltration, the fucoidan and laminarin may be dialyzed and dried by any conventional means such as spray drying, drum drying or freeze drying.

The fucoidan and laminarin can be separated from the exudate solution in any order as appropriate or desired.

The fucoidan and laminarin obtained in the present invention were found to be the "native" fucoidan and laminarin that exists in the plant (i.e., fucoidan and laminarin that are not depolymerized) in clear distinction to conventional processes utilizing chemical extraction and thermal degradation techniques that degrade (and depolymerize) the fucoidan and laminarin. For example, surprising low amounts of any alginate, pigments, polyphenolics, proteases, acids, and other components of seaweed are found in the fucoidan and laminarin obtained from the present invention as compared to conventional chemical and mechanical extraction techniques. Accordingly, at least 90%, 95%, 98%, 99%, or 100% of the fucoidan and laminarin obtained in step (iii) of the present invention is not depolymerized.

After the exudate solution is filtered and dried to separate the fucoidan from the exudate solution, a powder containing the fucoidan is obtained. This powder generally comprises from about 70 to 90 wt % fucoidan, more typically, from about 73 to 85 wt %, fucoidan, as measured by the Marinova Method. For example, the amount of fucoidan found in the dried powder from *Laminaria hyperborea* has been found in an amount of 74 to 85 wt % with the balance including proteins, inorganic salts and water.

The amount of the exudate solution (liters) per ton of live, harvested seaweed that can be collected in the present invention can be greater than 30 liters/ton, 40 liters/ton, 50 liters/ton, and 55 liters/ton. More specifically, a total amount of 30-110 liters, 40 to 110 liters, 50 to 110 liters, and 55 to 110 liters of exudate solution per ton of live, harvested seaweed can be collected in the exudation process of the present invention.

The fucoidan can be obtained from the exudate solution in the present invention in an amount of greater than 2 g/liter of exudate solution, preferably, greater than 4 g fucoidan/l of exudate solution, greater than 6 g fucoidan/l of exudate solution, greater than 10 g fucoidan/l of exudate solution, greater than 15 g fucoidan/l of exudate solution, greater than 20 g/l of exudate solution, or greater than 25 g fucoidan/l of exudate solution. In some embodiments, the fucoidan yield is from 2 g to 35 g fucoidan/liter of exudate solution, more preferably, 4 g to 35 g/l of exudate solution, 6 g to 35 g/l of exudate solution, 10 g to 35 g/l of exudate solution, and 15 g to 35 g/l of exudate solution. In some cases, the amount of the fucoidan obtained from the seaweed in the exudation process of the present invention is greater than 60 g/ton of live, harvested seaweed, more specifically, greater than 80 g/ton of live, harvested seaweed; greater than 100 g/ton of live, harvested seaweed; greater than 120 g/ton of live, harvested seaweed; greater than 150 g/ton of live, harvested seaweed; greater than 180 g/ton of live, harvested seaweed; greater than 220 g/ton of live, harvested seaweed; greater than 300 g/ton of live, harvested seaweed; greater than 400 g/ton of live, harvested seaweed; greater than 500 g/ton of live, harvested seaweed; greater than 600 g/ton of live, harvested seaweed; and greater than 700 g/ton of live, harvested seaweed. For example, the amount of fucoidan obtained in the present invention can be 60 to 3,850 g fucoidan/ton of live, harvested seaweed, more particularly, 220 g to 1,050 g fucoidan/ton of live, harvested seaweed; and fucoidan from the exudate solution of *Laminaria hyperborea* can be obtained in amounts greater than 400 g/ton of live, harvested *Laminaria hyperborea*, greater than 500 g/ton of live, harvested *Laminaria hyperborea*, and greater than 600 g/ton of live, harvested *Laminaria hyperborea*.

The laminarin obtained from the exudate solution in the present invention is generally in an amount of greater than 0.01 g laminarin/l of exudate solution, greater than 0.1 g laminarin/l of exudate solution, greater than 0.5 g/l of exudate solution, greater than 1 g/l of exudate solution, greater than 2 g/l of exudate solution, greater than 4 g/l of exudate solution, greater than 6 g/l of exudate solution, greater than 8 g/l of exudate solution, greater than 10 g/l of exudate solution, greater than 15 g/l of exudate solution and greater than 20 g/l of exudate solution. In some embodiments, the laminarin is obtained from the exudate solution in an amount of from 0.01 g to 30 g/l of exudate solution, 0.1 g to 30 g/l of exudate solution, 0.5 g to 30 g/l of exudate solution, 1 g to 30 g/l of exudate solution, 2 g to 30 g/l of exudate solution, and 4 g to 30 g/l of exudate solution. In some cases, the amount of the laminarin obtained from the seaweed in the exudation process of the present invention is greater than 0.3 g/ton of live, harvested seaweed; greater than 3 g/ton of live, harvested seaweed; greater than 15 g/ton of live, harvested seaweed; greater than 30 g/ton of live, harvested seaweed; greater than 60 g/ton of live, harvested seaweed; greater than 120 g/ton of live, harvested seaweed; greater than 180 g/ton of live, harvested seaweed; greater than 240 g/ton of live, harvested seaweed; greater than 300 g/ton of live, harvested seaweed; and greater than 500 g/ton of live, harvested seaweed. More particularly, the laminarin may be obtained in an amount of from 0.3 g to 3,300 g/ton of live, harvested seaweed, more particularly, from 11 g to 900 g/ton of live, harvested seaweed.

It is possible that, in some situations, the exudate solution from the live, harvested seaweed can be relatively viscous or the live harvested seaweed could be exuding more slowly than usual and that such could have an impact on the resulting yield. In such situations, to further increase the efficiency of the exudation process and thereby increase the yield of fucoidan and laminarin, the live, fresh seaweed can be rinsed with water (typically after the initial collection of the exudate solution) at least one, two or three times and this water rinse can be performed in a batch or counter-current rinsing system A useful counter-current rinsing system would be one in which the seaweed and rinse water are moving in opposite directions of one another. The resulting rinse water will have additional exudate and can be added to the exudate solution collected in step (ii), but prior to step (iii), or the fucoidan or laminarin can be separated directly from the rinse water. The rinse temperature can be <100° C., preferably <30° C. (to avoid thermal degradation).

The yield of exudate can further be improved by pressing or squeezing the exuding seaweed by any variety of mechanical means.

A preservative can be added to the seaweed during the exudation process to reduce bacterial and microbial content and thereby assist the exudation process. When added to the seaweed, the preservative may be used in amounts up to 1 wt % of the seaweed, but higher amounts can be desirable. The preservative may also be added to the exudate solution in an amount up to 0.5 wt % of the exudate solution. The preservative is typically an anti-microbial agent. One preferred preservative is formaldehyde.

The fucoidan obtained in the present invention is useful in a variety of products including dietary supplements or "nutriceuticals", cosmetic supplements or "cosmiceuticals", externally applied medicinal applications such as ointments, adjuncts to implantable devices such as stents and functional foods.

The laminarin obtained in the present invention is useful in a variety of products including dietary supplements or "nutriceuticals," cosmetic supplements or "cosmiceuticals," externally applied medicinal applications such as ointments and functional foods.

The present invention is now described in more detail by reference to the following examples, but it should be understood that the invention is not construed as being limited thereto. Unless otherwise indicated herein, all parts, percents, ratios and the like are by weight.

EXAMPLES

Example 1

Live, fresh harvested *Laminaria hyperborea* was collected and cut to approximately 10 cm pieces. No water was added to the harvested or cut seaweed and the seaweed was maintained at ambient temperature. The live, fresh harvested seaweed (containing only that amount of seawater that accompanied the seaweed during harvesting) was allowed to exude at temperatures below 30° C. for approximately three days after which approximately 60 liters of exudate solution/ton of seaweed was collected.

950 liters of the exudate solution was then set aside and 1 liter thereof was used to determine the initial fucoidan yield in the exudate solution using alcohol precipitation. The exudate solution was found to have a viscosity of 11.7 cps (using a Brookfield Viscometer with LV adapter, spindle 61, at 60 rpm, at room temperature), pH 5.75, TBU (turbidity units) 60 NTU, and a dry matter of 4.4% (determined after drying overnight at 105° C.). The exudate solution was added to isopropyl alcohol (1 part of exudate solution to 2 parts isopropyl alcohol) under stirring at room temperature to precipitate fucoidan into long fibers and the fucoidan was collected on 80 mesh, dried, pressed and freeze dried overnight (105° C.) to determine yield. The yield of fucoidan in this 1 liter sample of exudate solution was approximately 16.4 g fucoidan/l of exudate solution.

After determining the yield of the fucoidan in the exudate solution using alcohol precipitation as discussed above, the remaining exudate solution (about 949 liters) was filtered through a Plate & Frame pressure filter in two cycles (about 500 liters/cycle; each for one hour) with help of a filter aid (heated stone weighing 22.5 kg) to remove large solid debris from the seaweed. The filtrate had a viscosity of 4.4 cps (Brookfield LV viscometer with LV adapter, spindle 00, at 60 rpm, at room temperature), TBU 46 NTU, and a concentration of 12.2 g fucoidan/l of filtrate. A preservative (formalin) was then added (0.3% by weight of the filtrate), and the filtrate was stored for 19 days at about 0° C. The filtrate was then ultrafiltrated using a MWCO of 10 kDa (Prostak system (Millipore)) and concentrated. After ultrafiltration and concentration (to approximately one fifth of the volume), the solution was dialyzed three times each with equal parts water. Finally, the retentate was spray dried in a co-current spray dryer using a high pressure nozzle with 235° C. inlets on the air and about 100° C. outlet on the air. After spray drying, a brown powder containing the fucoidan was obtained. The brown powder had a viscosity in a 1% water solution of 7.3 cps (Brookfield LV viscometer having an LV adapter, spindle 00, 60 rpm, at room temperature) and a pH 6.89. The moisture in the dried powder was 6.84%. The yield was 7.3 kg powder from the approximately 950 liters of exudate solution. Approximately 85 wt % of this powder was fucoidan with about 7 wt % moisture, 2 wt % salt and 4 wt % protein.

Example 2

Live, fresh harvested *Laminaria hyperborea* was cut onboard the boat into approximately 1-20 cm size pieces. The exudate solution collected from the bottom of the boat was pumped into a container. No water was added to the harvested or cut seaweed and the seaweed was maintained at temperature below 30° C. The live, fresh harvested seaweed (containing only that amount of seawater that accompanied the seaweed during harvesting) was allowed to exude at temperatures below 30° C. for approximately seven days after which approximately 1,650 liters of exudate solution was obtained. 0.3% formalin was added to this exudate solution for preservation. A portion of the exudate solution (100 ml) was alcohol precipitated (using isopropyl alcohol 2 parts alcohol to 1 part exudate solution) and gave a fucoidan content of 2.6 g/l of exudate solution. The dry matter of the exudate solution after drying overnight at 105° C. was 5.7%.

After determining the yield of the fucoidan in the exudate solution using alcohol precipitation as discussed above, the remaining exudate solution (about 1,650 liters less the 100 ml used in the alcohol precipitation) was filtered through a Plate & Frame pressure filter in three cycles (about 500 liters/cycle; each for one hour) with help of a filter aid (heated stone weighing 22.5 kg) to remove large solid debris from the seaweed. The filtrate was then stored for 1 day at 2-7° C. To improve the ultrafiltration, the solution was heated to about 65° C. with a tube heat exchanger. The storage time was about 2 minutes through the heat exchanger. The solution was then concentrated with a MWCO of 100 kDa (spiral membrane from Alfa Laval). After ultrafiltrating, the solution was dialyzed three times each with equal parts water. Finally, the retentate was spray dried in a co-current dryer with a high pressure nozzle 180 bar with 238° C. inlets and about 105° C. outlets on the air. The yield of the powder was approximately 5.28 kg/1,650 liters of exudate solution. The dried powder had a viscosity in 1% water solution of 26.0 cps (Brookfield LV viscometer having an LV adapter, spindly 00, 60 rpm, at room temperature) and a pH 6.98. The moisture of the dried powder was 4.40%. Approximately 85 wt % of this powder was fucoidan and approximately 6 wt % was protein.

Example 3

Live, fresh harvested *Laminaria hyperborea* was cut to approximately 10 cm pieces of seaweed. No water was added to the seaweed and the seaweed was maintained at ambient temperature. The live, fresh harvested seaweed was allowed to exude at room temperature for approximately three days after which approximately 9,000 liters of exudate solution was collected. 9,000 liters of the exudate solution was then filtered through a Plate & Frame pressure filter to remove large solid debris from the seaweed and the volume reduced to 4,000 liters by heating and vacuum.

10 ml of the volume reduced filtrate were then analyzed and had a pH of 6, 3-4% dry matter, and Brix units of 4-5. 200 ml of the volume reduced filtrate were then subjected to alcohol precipitation (using isopropyl alcohol) as described in Example 1 to remove the fucoidan from the filtrate. After alcohol precipitation and removal of the fucoidan, the filtrate was allowed to sit overnight. The laminarin precipitated out of the filtrate and was recovered by filtration. The laminarin was obtained from the filtrate in an amount of 0.1 g laminarin/l of filtrate (not including the weight of the alcohol in the filtrate) corresponding to 0.044 g/l of exudate solution.

Separately, approximately 1,000 liters from the 4,000 liters of the volume reduced filtrate (obtained after the above step of filtration through a Plate & Frame pressure filter) was subjected to ultrafiltration using a MWCO of 20 kDa spiral membrane to separate the fucoidan from the exudate solution, and the filtrate (containing the laminarin) was collected to obtain 860 liters of filtrate. 1 liter of this filtrate was then analyzed and found to have a viscosity of 1.22 cps (Brookfield LV viscometer with LV adapter, spindle 00, 60 rpm, at room temperature), and a dry matter of 4.85%. The filtrate was also found to have a laminarin content of 2.16 g laminarin/l of filtrate solution (using alcohol precipitation overnight with 2 parts of alcohol to one part of filtrate (100 ml of filtrate were used)). The filtrate was concentrated 6.1 times using a MWCO of 1 kDa spiral membrane to 140 liters (having a concentration of 13-14 g of laminarin/liter of retentate) and then dialyzed with 600 liters of water using a MWCO 1 kDa spiral membrane. The final conductivity of the filtrate after dialysis was 358 Micron Siemens. The retentate was concentrated to 65 liters and had 22 g laminarin/liter of retentate and a viscosity of 1.30 cps (Brookfield LV viscometer with LV adapter, spindle 00, 60 rpm, at room temperature). About 55 liters of the retentate were then spray dried and found to have a dry matter of 3.45 wt %. The conditions for spray drying were: 1 mm nozzle, 1.5 kp/cm$^2$, air temperature at the inlet was 147-177° C. and at the outlet was about 100-106° C. The yield was approximately 1.3 kg laminarin (obtained from the 860 liters of volume reduced filtrate).

While the invention has been described in detail and with reference to specific embodiments thereof, it will be apparent to one skilled in the art that various changes and modifications can be made therein without departing from the spirit and scope thereof.

What is claimed is:

1. A process for obtaining at least one of fucoidan or laminarin from live, harvested seaweed, wherein said process comprises the steps of:
   (i) harvesting seaweed comprising fucoidan and laminarin to obtain said live, harvested seaweed, wherein said live, harvested seaweed exudes until death to form an exudate solution;
   (ii) collecting said exudate solution, wherein said exudate solution comprises fucoidan and laminarin dissolved in said exudate solution; and
   (iii) separating said at least one of fucoidan or laminarin from said exudate solution.

2. The process of claim 1, wherein said fucoidan is obtained from said exudate solution in an amount greater than 2 g/liter of said exudate solution.

3. The process of claim 1, wherein said fucoidan is obtained from said exudate solution in an amount greater than 4 g/liter of said exudate solution.

4. The process of claim 1, wherein said laminarin is obtained from said exudate solution in an amount greater than 0.01 g/liter of said exudate solution.

5. The process of claim 1, wherein said laminarin is obtained from said exudate solution in an amount greater than 0.5 g/liter of said exudate solution.

6. The process of claim 1, wherein a total of 30-110 liters of exudate solution per ton of live, harvested seaweed is collected in step (ii).

7. The process of claim 1, wherein fucoidan is separated from the exudate solution and obtained in an amount of 60 g to 3,850 g fucoidan/ton of live, harvested seaweed.

8. The process of claim 1, wherein fucoidan is separated from the exudate solution and obtained in an amount of 220 g to 1,050 g fucoidan/ton of live, harvested seaweed.

9. The process of claim 1, wherein laminarin is separated from the exudate solution and obtained in an amount of 0.3 g to 3,300 g/ton of live, harvested seaweed.

10. The process of claim 1, wherein laminarin is separated from the exudate solution and obtained in an amount of 11 g to 900 g/ton of live, harvested seaweed.

11. The process of claim 1, wherein said step (iii) comprises separating said fucoidan or said fucoidan and laminarin from said exudate solution using alcohol precipitation.

12. The process of claim 1, wherein said seaweed is from the algal class Phaeophyceae.

13. The process of claim 1, wherein said seaweed comprises seaweed from the algal orders Laminariales, Fucales, Ectocarpales, Dictyotales, Scytosiphonales, and Desmarestiales.

14. The process of claim 1, wherein said seaweed comprises seaweed from the algal families Laminariaceae, Lessoniaceae, Durvillaeaceae, Alariaceae, Chordaceae, Fucaceae, Sargassaceae, Himanthaliaceae, Chordariaceae, Adenocystaceae, Dictyotaceae, Scytosiphonaceae, and Desmarestiaceae.

15. The process of claim 1, wherein said seaweed comprises seaweed from the algal genera *Laminaria, Durvillaea, Arthrothamnus, Macrocystis, Nereocystis, Saccharina, Ecklonia, Lessonia, Elsenia, Alaria, Undaria, Chorda, Ascophyllum, Fucus, Silvetia, Pelvetia, Sargassum, Hizikia, Bifurcaria, Himanthalia, Cladosiphon, Nemacystus, Dictyosiphon, Chordaria, Saundersella, Adenocystis, Spatoglossum, Dictyota, Padina, Scytosiphon, Petalonia*, and *Desmarestia*.

16. The process of claim 1, wherein said seaweed comprises seaweed from the algal species *Laminaria digitata, Laminaria hyperborea, Laminaria japonica, Laminaria angustata, Laminaria brasilliensis, Laminaria cichorioides, Arthrothamnus bifidus, Macrocystis pyrifera, Nereocystis luetkeana, Saccharina longicruris Saccharina sculpera, Ecklonia maxima, Ecklonia cava, Ecklonia kurome, Lessonia nigrescens, Lessonia vadosa, Elsensia bicyclis, Alaria marginata, Undaria pinnatifida, Chorda filum, Ascophyllum nodosum, Fucus vesiculosus, Fucus distichus, Fucus evanescens, Fucus serratus, Fucus spiralis, Silvetia babingtonii, Pelvetia canaliculata, Sargassum fusiforme, Sargassum horneri, Sargassum muticum, Sargassum stenophyllum, Hizikia fusiformis, Bifurcaria bifurcata, Himanthalia elongate, Cladosiphon okamuranus, Nemacystus decipiens, Dictyosiphon foeniculaceus, Chordaria flagelliformis, Chordaria gracilis, Saundersella simplex, Adenocystis utricularis, Spatoglossum schroederi, Dictyota dichotoma, Dictyota menstrualis, Padina pavonica, Scytosiphon lomentaria, Petalonia fascia, Durvillaea antartica, Durvillaea potatorum*, and *Desmarestia intermedia*.

17. The process of claim 1, wherein said seaweed is *Laminaria hyperborea*.

18. The process of claim 1, wherein a preservative comprising an antimicrobial agent is added to at least one of the seaweed in step (i), the exudate solution in step (i) or the exudate solution in step (ii).

19. The process of claim 18, wherein said preservative is formaldehyde.

20. The process of claim 1, wherein said seaweed in step (i) is cut into pieces of >1 cm.

21. The process of claim 1, with the proviso that said seaweed in step (i) is not milled or ground.

22. The process of claim 1, wherein at least 95% of said at least one of fucoidan or laminarin obtained in step (iii) is not depolymerized.

23. The process of claim 1, wherein the live, harvested seaweed is subjected to a water rinse after collection of the exudate solution, said water rinse comprises a counter-current rinse and the fucoidan or laminarin is separated from the rinse water.

24. The process of claim 1, wherein said live, harvested seaweed is piled together with no added water.

25. The process of claim 1, wherein the seaweed is not degraded by thermal treatment at temperatures above 30° C., acid treatment or alkali treatment.

26. The process of claim 1, wherein said separating step (iii) comprises separating at least one of said fucoidan or said laminarin from said exudate solution using ultrafiltration.

27. The process of claim 1, wherein said exudate solution is collected after 12 hours of exudation.

28. The process of claim 1, wherein said exudate solution is collected after two days of exudation.

29. The process of claim 1, wherein said separating step (iii) comprises a first filtration step to remove solid debris from said exudate solution followed by a second filtration step to separate said fucoidan from said laminarin.

30. The process of claim 29, wherein said second filtration step comprises ultrafiltering said exudate solution through a filter having a molecular weight cut off of greater than 10 kDa to obtain said fucoidan as a retentate and said laminarin in a filtrate followed by drying the Fucoidan.

31. The process of claim 30, wherein said laminarin in said filtrate obtained in said second filtration step is nano-filtered by passing said filtrate through a filter having a molecular weight cut off of 1 kDa or less to obtain said laminarin as a second retentate followed by drying the laminarin.

32. The process of claim 1, wherein said exudation is conducted in the absence of added water.

33. The process of claim 1, wherein said live, harvested seaweed is rinsed with water at least once during exudation.

34. The process of claim 1, wherein said live, harvested seaweed is pressed or squeezed during exudation.

* * * * *